United States Patent

[11] 3,620,583

[72] Inventor Thomas J. Koprowski
 Northridge, Calif.
[21] Appl. No. 74,339
[22] Filed Sept. 22, 1970
[45] Patented Nov. 16, 1971
[73] Assignee The United States of America as represented by the United States Atomic Energy Commission

[54] CONTROLLED-MOTION COMPENSATOR
 5 Claims, 3 Drawing Figs.
[52] U.S. Cl. .................................................. 308/184
[51] Int. Cl. ......... ........................................ F16c 27/00
[50] Field of Search .......................................... 308/184, 6

[56] References Cited
UNITED STATES PATENTS
629,011  7/1899  Miller ........................... 308/184

Primary Examiner—Martin P. Schwadron
Assistant Examiner—Frank Susko
Attorney—Roland A. Anderson ABSTRACT: A system for coupling a pair of independent bodies and controllably compensating relative motion therebetween comprising a first coupling element defining a cylindrical socket and a second coupling element defining a disk with a tongue extending therefrom, said second coupling element disposed within said first coupling element, and hydraulic means acting between the coupling elements for controlling the stiffness of coupling therebetween.

PATENTED NOV 16 1971 3,620,583

INVENTOR.
Thomas J. Koprowski
BY
ATTORNEY.

CONTROLLED-MOTION COMPENSATOR

BACKGROUND OF THE INVENTION

The invention described herein was made in the course of, or under, Contract AT(29-2)-2049 with the United States Atomic Energy Commission.

It becomes necessary in various instances that independent bodies be coupled together wherein a relatively small degree of independent motion of the bodies must be allowed. Couplers are known that provide protection against independent motion or shock loads between independent bodies, but in most cases there are no means to control the amount of shock rigidity between the independent bodies.

SUMMARY OF THE INVENTION

The present invention comprises a method of coupling two independent bodies together while at the same time, providing means to control the amount of shock rigidity between the two. More specifically, the invention comprises a cylindrical socket-coupling element attached to one independent body, a disk-shaped second coupling element nesting within the cylindrical socket, and a tongue extending from the disk through an opening in the cylindrical socket, and attached to the other independent body. Controllable hydraulically actuated buffer pistons resiliently act between the periphery of the disk and the cylindrical socket, and stabilization pistons resiliently act between the tongue extending from the disk and the cylindrical socket. By regulation of the hydraulically actuated buffer pistons and stabilization pistons, it is possible to control the shock rigidity of one body relative to the other.

Accordingly, it is an object of the present invention to provide a means to eliminate the transmission of shock vibration between two mechanically connected independent bodies.

Another object of the present invention is to provide a means to control the rate of shock absorption between two mechanically connected bodies.

Another object of the present invention is to provide a controllable shock attenuation system for transportable rolling elements.

A further object of the present invention is to provide a means to rigidize and make positive a mechanical motion compensation system between two independent bodies in order to transmit work.

A still further object of the present invention is to provide a means of controlling shock due to impact between two bodies mechanically coupling together.

DETAILED DESCRIPTION OF THE INVENTION

Figure 1:
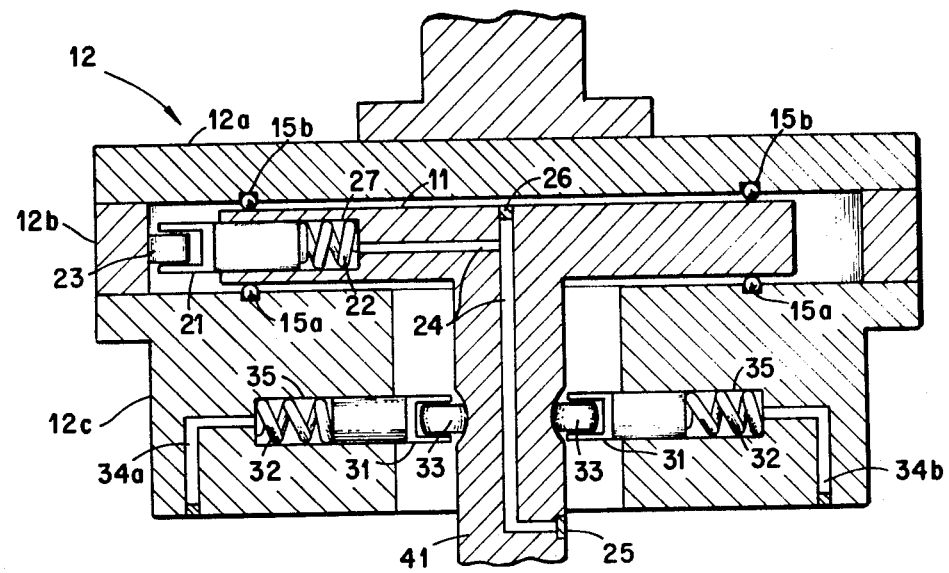
FIG. 1 is a sectional view of the controlled motion compensation system in accordance with the invention.

As shown in FIG. 1, the present invention generally provides for the elimination or control of the rate of shock absorption between two independent bodies by the controlled interaction between the cylindrical socket 12 and the disk 11 and tongue 41 attached to the disk. The controlled interaction is provided through buffer pistons 21 and stabilization pistons 31.

Disk 11 has two parallel, hardened, and ground flat round faces and is of sufficient thickness to accommodate buffer piston cylinder bores 27. Buffer piston cylinder bores 27 are precision bored normal to the peripheral wall of disk 11, are parallel to its flat sides, and are spaced 120° apart. Cylinder bores 27 extend into disk 11 a distance sufficient to contain spring 22 and a portion of piston 21. The interior end of cylinder bores 27 are continued into smaller drilled hydraulic passageways 24 meeting jointly in the center of disk 11 forming a manifold. A portion of buffer piston 21 is enclosed by and operably rides within cylinder bore 27. The distal portion of buffer piston 21 is bifurcated with roller 23 fitted into the bifurcation and the roller axle pinned to the bifurcations. The roller mates with and rolls on the inside circumferential surface of the annular peripheral wall 12b of cylindrical socket 12. Spring 22, which nests in the innermost portion of cylinder bore 27 spring-loads the buffer pistons 21 and thus keeps roller 23 against the inner surface of socket wall 12b.

The tongue 41 is centrally attached to one face of disk 11 and extends normally therefrom through an opening in one end wall 12c of cylindrical socket 12. Hydraulic passageway 24 is drilled through the upper face of disk 11, into the manifold formed of passageways 24 from the buffer piston cylinders, and then coaxially through the shaft-forming tongue 41 until socket end wall 12c is cleared. Passageway 24 then exits to the exterior of the tongue shaft at outlet 25. The drill hole in the upper face of disk 11 is plugged with plug 26.

The socket end wall 12c is circular in shape, has a centrally located opening extending from the internal socket portion to the outside to facilitate free traversal by tongue 41. End wall 12c contains the stabilization piston cylinder bores 35 and connecting hydraulic passageways 34a and 34b with outlets 36a and 36b.

Two stabilization pistons 31 provide for shock absorption between the tongue 41 and the socket wall 12c. Rollers 33, which mate with and roll on the tongue 41, are similarly constructed as were the rollers 23 in the buffer pistons 21, rolling between the bifurcations of stabilization pistons 31.

Stabilization pistons 31 are partially enclosed by and ride within cylinder bores 35 which are located diametrically opposite each other in the circular opening within socket wall 12c. Springs 32, which nest in the portion of cylinder bores 35 serve to spring-load the two stabilization pistons 31, thus keeping roller 33 against tongue 41. Hydraulic passageways 34a and 34b are drilled from the interior end of the cylinder bores 35 and from the lower portion of the socket wall 12c. Passageways 34a and 34b are not internally connected.

Ball races 15a and 15b, circular and coaxial to the central opening in socket wall 12c, are machined into the interior flat faces of the socket end walls 12c and 12a, to facilitate rotatable support of the disk 11 within the socket.

During operation as a motion compensation system and when it is desired to control the rate of shock absorption between the two bodies or to make a completely rigid mechanical link, the three buffer pistons and two stabilization pistons are hydraulically driven and thereby regulate the stiffness of the shock absorption system. Hydraulic sealing between the pistons and their respective cylinder bores are provided by O-rings or other known means.

Thus the inventive combination of the buffer pistons, stabilization pistons, the spring loading, and the controllable resilient hydraulic boast when desired, provide selected isolation of shock movement from one portion of the invention to the other. In operation as a motion compensation system between an object to be picked up and a transporting vehicle, the operator normally pressurizes the hydraulic system to stabilize the load end of the work system during the pickup operation and then relaxes the pressure during object installation to allow the object to drift as necessary for guiding into place.

Typical dimensions for the motion compensation system shown in FIG. 1 are as follows: disk 11, 10.5 inches diameter, 2.5 inches thickness; cylindrical socket 12 inside circumferential wall diameter, 13.5 inches; cylindrical socket 12 lower portion centrally located opening diameter is 5.5 inches; and tongue 41 shaft diameter is 2.5 inches.

Figure 2:
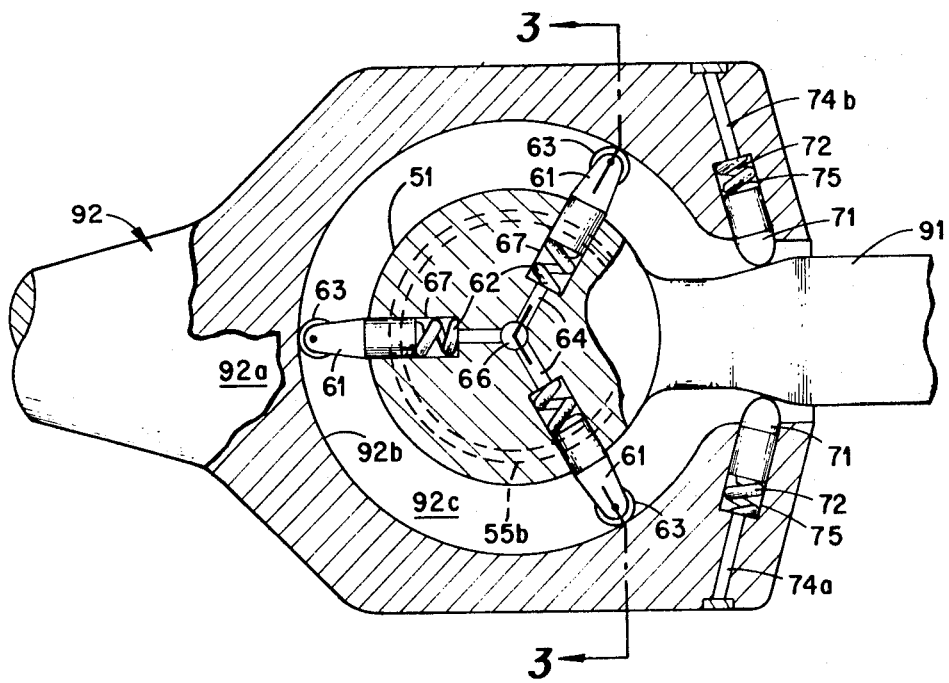
FIG. 2 is a plan view with portions broken away of a modified form of the invention.

FIG. 2 shows a second and similar motion compensation system suggested by the system illustrated in FIG. 1. In FIG. 2, tongue 91 is attached at the peripheral wall of disk 51 and the tongue 91 extends through an opening in the peripheral wall 92b of a cylindrical socket 92, for connection to one of the independent bodies. Three equally spaced cylinder bores 67 are precision drilled into the circumferential walls of the disk 51. Buffer pistons 61 extend from cylinder bores 67 with rollers 63 situated between bifurcations of the distal end of buffer pistons 61 and mating with and rolling on the interior surface of socket wall 92b. Springs 62 spring-load the buffer pistons 61 and hydraulic passageways 64 extend from the interior end of the cylinder bores 67 to the center of the disk 51 to form a manifold of inlets. A hole is drilled from one face of disk 51 to meet the manifold of the three passageways 64 and the hole is tapped to provide hydraulic connection 66. Cylinder bores 75 are drilled into the neck portion of cylindrical socket wall 92b formed by the opening therein for tongue 91. Springs 62 serve to spring-load stabilization pistons 71 disposed within the bores 75. The stabilization pistons 71 are blunt ended, conical-shaped and ride against tongue 91. Hydraulic passageways 74a and 74b through outlets 76a and 76b permit hydraulic control over the stabilization pistons 71. Ball races 55a and 55b are machined into the interior faces of cylindrical socket end walls 92a and 92c respectively.

Figure 3:
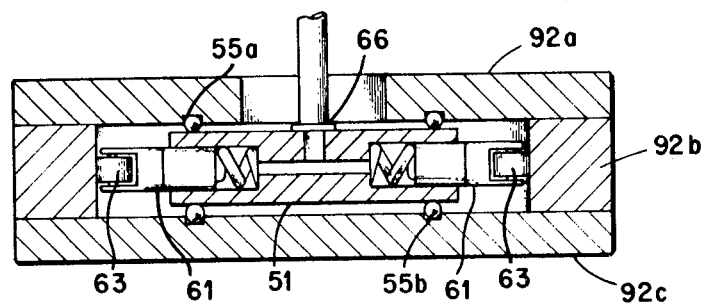
FIG. 3 is a sectional view taken at 3-3 of FIG. 2 showing the bearings race and lower section of the modified form of the invention.

FIG. 3 shows a sectional view of FIG. 2 taken along a plane defined by 3—3 which shows the bearings races 55a and 55b and lower portions of cylindrical socket 92.

Although the foregoing embodiments have been described in detail, there are obviously many other embodiments and variations in configurations which can be made by a person skilled in the art without departing from the spirit, scope, or principle of the invention. Therefore, this invention is not to be limited except in accordance with the scope of the appended claims.

What I claim is:

1. A system for coupling a pair of bodies and controllably compensating relative motion therebetween comprising a coupling element defining a cylindrical socket, a second coupling element including a disk having a tongue projecting therefrom, said disk disposed within said socket and transversely movable relative thereto with said tongue extending freely through said first coupling element exteriorly of said socket, said first coupling element of said tongue of said second coupling element adopted for connection to said bodies; controllable hydraulically actuated buffer means resiliently acting between the periphery of said disk and inside peripheral wall of said socket, and controllable hydraulically actuated stabilization means resiliently acting between said first coupling element and said tongue of said second coupling element; whereby the resiliency of said buffer means and said stabilization means is controllable to controllably compensate relative motion between said coupling elements.

2. The apparatus as defined in claim 1 wherein said buffer means comprise at least three equally spaced buffer pistons extending normally from said disk periphery and having rollers on the distal end, said rollers mating with and rolling on said cylindrical socket inside peripheral walls; and said stabilization means comprise at least two stabilization pistons extending from said cylindrical socket, the distal end of said stabilization pistons mating with the tonguelike means extending from said disk.

3. The apparatus as defined in claim 2 wherein said buffer means pistons are spring-loaded and piston cylinders are hydraulically interconnected with known size orifices therebetween and controllable hydraulically driven by exterior hydraulic means, and said stabilization means pistons are spring-loaded and piston cylinders are hydraulically interconnected with known size orifices therebetween and controllably hydraulically driven by exterior hydraulic means.

4. The apparatus as defined in claim 3 wherein said tongue extends perpendicularly from one of said disk's faces exteriorly through a circular opening in said cylindrical socket, and said stabilization pistons extending diametrically from the interior wall of said circular opening, the distal ends of said stabilization pistons defining rollers which mate with and roll on said tongue.

5. The apparatus as defined in claim 3 wherein said tongue extends normally from the periphery of said disk exteriorly through an opening in said cylindrical socket, and said stabilization pistons extend from the interior wall of said opening, the distal ends of said stabilization pistons defining a blunted conical end which mate with said tongue.

* * * * *